Oct. 22, 1929.   O. C. BORNHOLT   1,732,877
TIRE CARRIER
Filed July 28, 1928   2 Sheets-Sheet 1

INVENTOR.
Oscar C. Bornholt
BY
ATTORNEYS

Oct. 22, 1929. O. C. BORNHOLT 1,732,877
TIRE CARRIER
Filed July 28, 1928 2 Sheets-Sheet 2
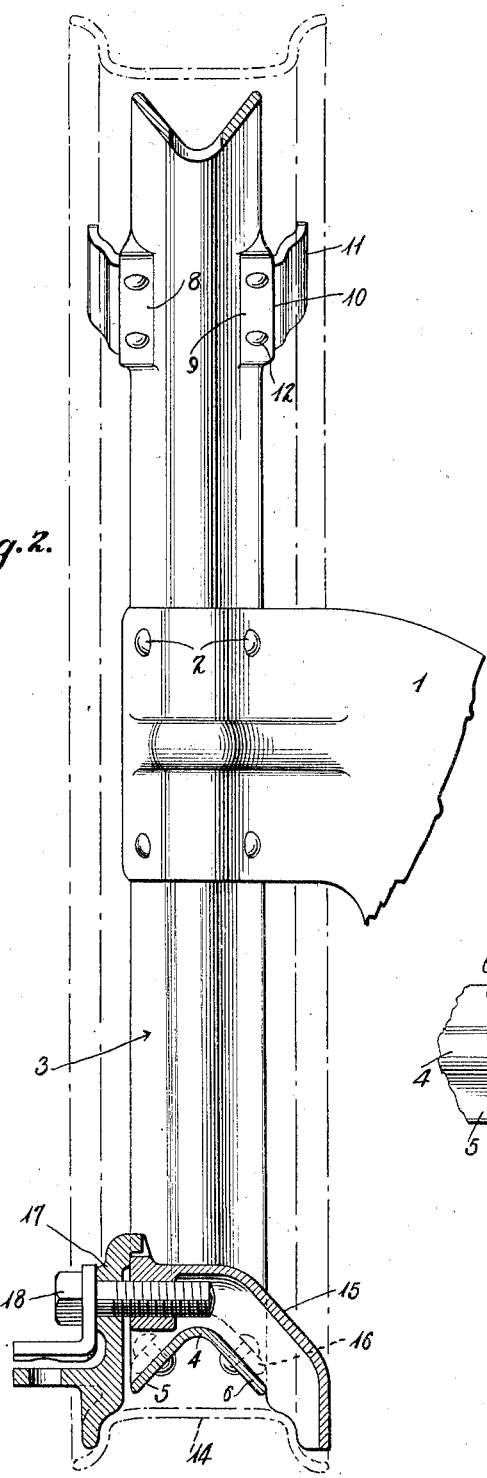
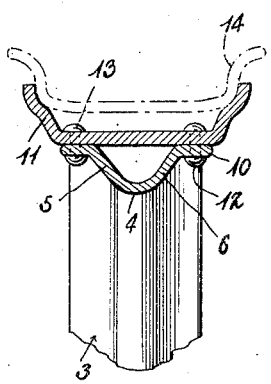
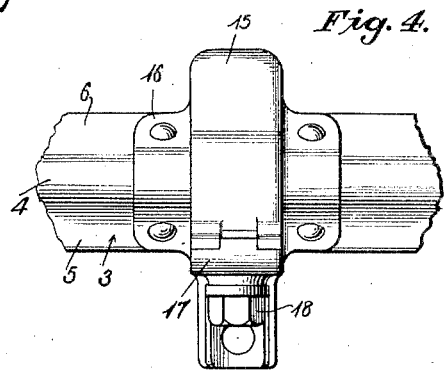
INVENTOR.
Oscar C. Bornholt
BY
ATTORNEYS Patented Oct. 22, 1929

1,732,877

UNITED STATES PATENT OFFICE

OSCAR C. BORNHOLT, OF INDIANAPOLIS, INDIANA, ASSIGNOR, BY MESNE ASSIGNMENTS, TO DETROIT AND SECURITY TRUST COMPANY, A CORPORATION OF MICHIGAN

TIRE CARRIER

Application filed July 28, 1928. Serial No. 295,863.

The invention relates to improvements in tire carriers of the ring type.

I have discovered that by rolling or otherwise shaping a strip of metal into a ring carrier wherein the side walls converge materially toward the central section of the ring and are there connected by a relatively narrow strip or portion of the metal, a carrier is produced that has sufficient strength and rigidity to withstand the uses to which an article of this kind is subjected from a minimum amount of metal.

It is, therefore, an object of my invention to provide a ring carrier which is preferably constructed from a strip of metal, with the side walls thereof diverging at an angle from a relatively narrow central section or web toward the outer ends thereof. By having a narrow web or central section connecting the converging side walls of the carrier and by having the outer ends of such walls separated a substantial distance a carrier is produced that possesses marked rigidity, yet utilizes a minimum amount of material for an article of this kind.

It is a further object of my invention to provide a ring carrier of this general type wherein the side walls are so fashioned that they receive and adequately retain at spaced intervals the tire supporting clips.

From a more specific aspect, the construction is one wherein the side walls at spaced intervals are flattened out to provide pockets receiving the clips with the upper surfaces of said clips lying not materially below the peripheral edges of the side walls of the carrier.

In the accompanying drawings,

Fig. 2 is a section on line 2—2 of Fig. 1,

Fig. 3 is a section on line 3—3 of Fig. 1, and

Fig. 4 is a view looking downwardly on the line 4—4 of Fig. 1.

Figure 1:
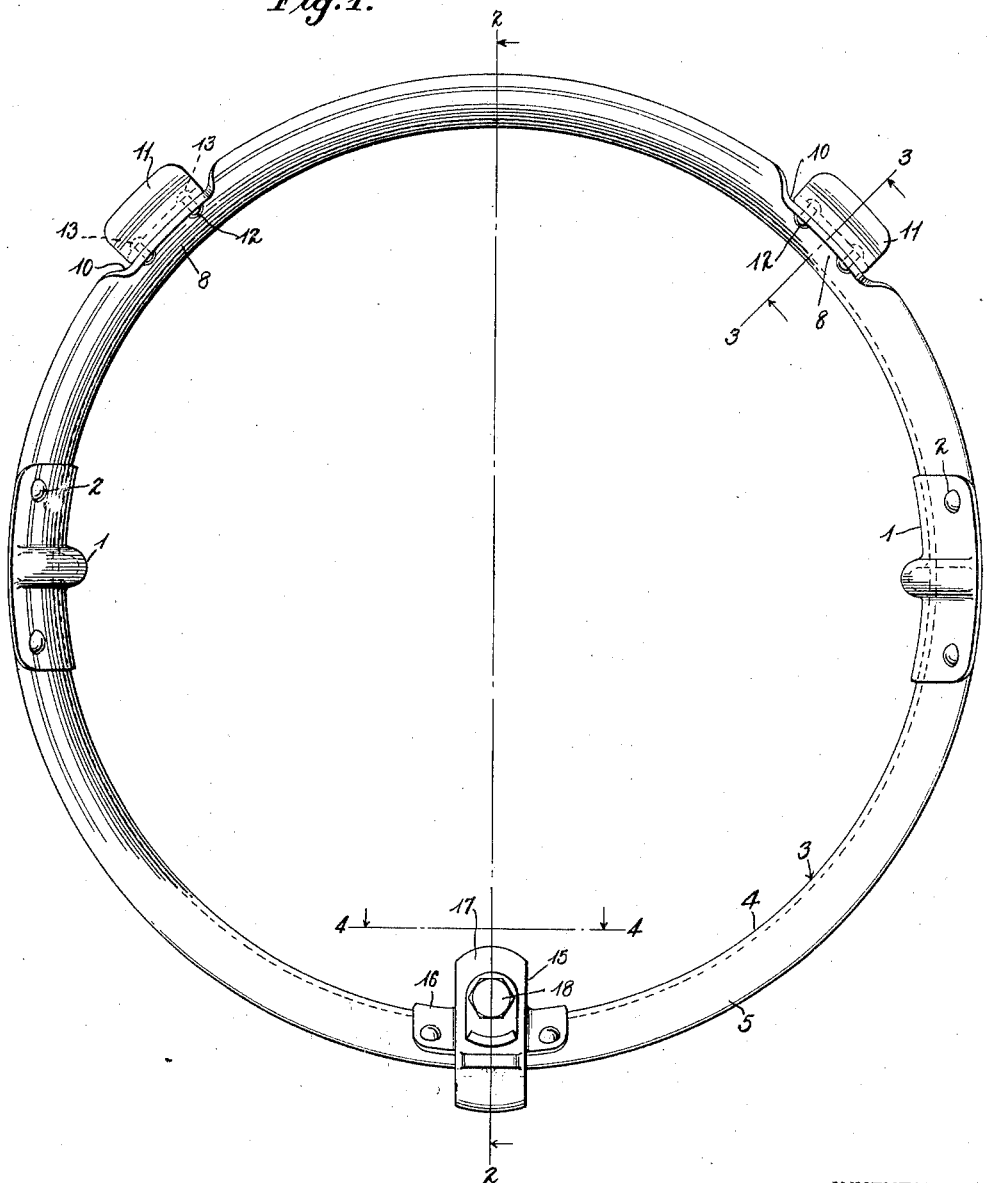
Fig. 1 illustrates a front view of the carrier.

Referring now more particularly to the drawings, wherein like reference characters indicate corresponding parts, the numeral 1 designates the supporting arm for the carrier which is shown as broken away. This arm is connected to an automobile chassis in any approved manner. The arm at its outer end is fastened by the rivets 2 to the carrier.

The carrier 3 is of ring or circular shape, being preferably constructed from a flat strip of metal which may be rolled, pressed, stamped or otherwise given the circular shape and cross-section of this carrier. The carrier can be made from any type of metal but is preferably constructed from a metal that may be rolled, stamped or shaped by similar methods of treatment.

The carrier has a narrow web or central section 4. In cross-section this central portion is curved throughout its width and serves to connect the diverging side walls 5 and 6 of the carrier ring. It is to be observed that while the side walls 5 and 6 of the ring converge and come quite close to one another at the central section 4 thereof, the outer ends of the walls are spaced from one another a very material distance.

I have found that by providing a carrier of the shape as shown in cross section in Figs. 2 and 3 that little material is consumed in providing the central section 4 of the carrier, yet this central section, by reason of its formation, serves to add to the carrier great rigidity. By having the side walls diverged at a most substantial angle from this relatively narrow connecting web or central section, the peripheral surface of the carrier is quite wide, offering thereby a most adequate support for the rim supporting clips which in turn receive and support the rim. The construction not only has this advantage, but as above stated, it has the material and added advantage of providing a carrier that possesses marked strength and rigidity and yet utilizes a minimum quantity of material since the connecting web is very narrow and contains but little metal as distinguished from channel carriers as generally used in the past where such connecting web is substantially disposed in a horizontal plane and is of considerable width.

The sides of the carrier ring at the points 8 and 9 are flattened out to provide the flat seats 10 which are located substantially below the periphery of the separated ends of the side walls. These flat seats represent substantially depressed pockets formed in the side walls of the carrier, the flattened out portions 10 of each side wall being in alinement and forming thereby the seating pockets for the rim supporting clips 11.

The rim supporting clips 11 are seated upon the flat upper surfaces 10 and are held in position by rivets 12 or other fastening devices. It is to be further observed that the heads 13 of the fastening rivets 12 which unite the clips 11 and the seats formed in the ring carrier lie substantially flush with the upper edges of the side walls of the ring carrier. By this construction the clips are not superimposed upon or extend above the upper edges of the side walls of the carrier but are so positioned in the pockets formed in the carrier that their upper edges and the upper surfaces of the heads 13 of the rivets 12 lie substantially flush with the upper edges of the side walls of the carrier.

The carrier ring may be provided with any suitable means for retaining the spare tire 14 in position thereon. I have shown a construction embodying a clamp member 15 which is fixedly attached by member 16 to the carrier ring and a removable jaw 17 retained in position by a removable bolt 18 coacting therewith as shown in Fig. 2. Any approved locking device may be used for retaining this jaw in a locked position and against unauthorized removal.

Having thus described my invention, what I claim is:

1. A ring type tire carrier of substantially V-shaped cross section, and having side walls spaced apart a substantial distance at their upper ends and converging and connected at their lower ends by a relatively narrow central section.

2. A tire carrier having side walls converging at a material angle toward the central section of the carrier and connected at such section by a narrow strip of material, said strip throughout its width being curved, said carrier being of substantially V-shaped cross section.

3. A tire carrier having spaced side walls at its periphery and pockets formed by depressing the material at the upper ends of said side walls to provide oppositely disposed seats below the periphery of the walls of the carrier.

4. A tire carrier having spaced side walls at its periphery and pockets formed by depressing the material at the upper ends of said side walls to provide oppositely disposed seats below the periphery of the walls of the carrier and rim clips seated in said pockets and united to the depressed material of said side walls.

5. A tire carrier having spaced side walls at its periphery, pockets formed by depressing the material at the upper ends of said side walls to provide oppositely disposed seats below the periphery of the walls of the carrier and rim clips seated in said pockets and united to the depressed material of said side walls, the base of said clips lying substantially within the plane of the outer edges of the side walls of said carrier.

6. A tire carrier for automobiles comprising a ring of substantially circular formation, and of substantially V-shaped cross section, said ring having an exteriorly rounded central section of narrow width, side walls spaced apart a substantial distance at their upper ends and converging and connected at their lower ends by said narrow central section, rim seats connected with said carrier and means for clamping the rim on the carrier.

In testimony whereof I affix my signature.

OSCAR C. BORNHOLT.